A. V. MELIN.
SNOW AND MUD SHOE.
APPLICATION FILED JAN. 11, 1922.
1,411,740.
Patented Apr. 4, 1922.
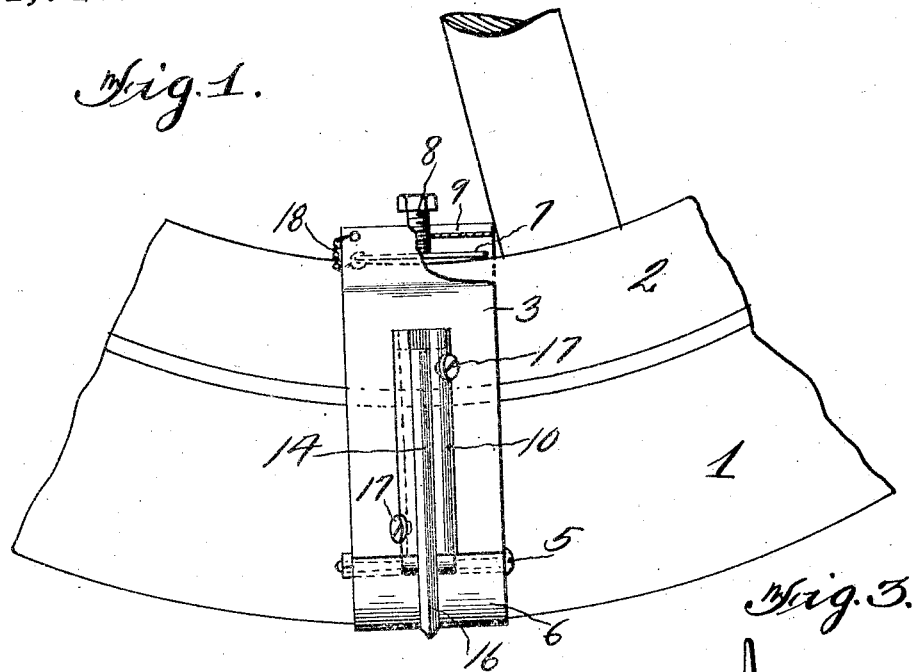
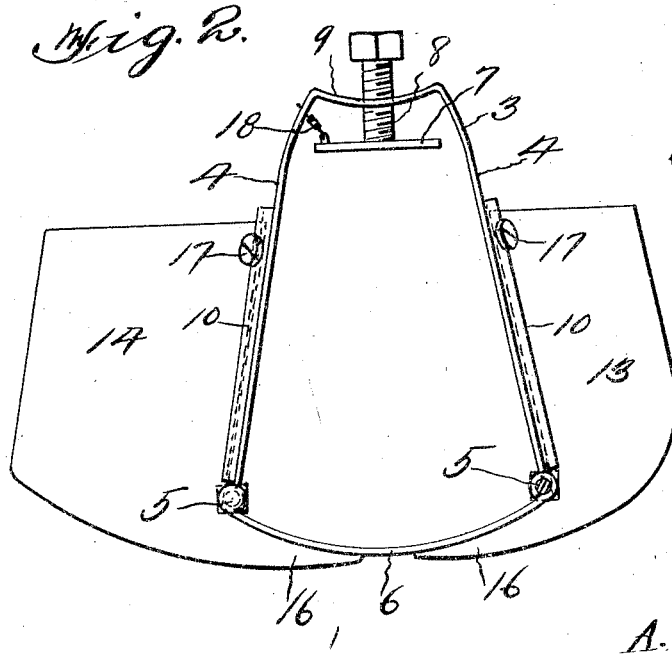
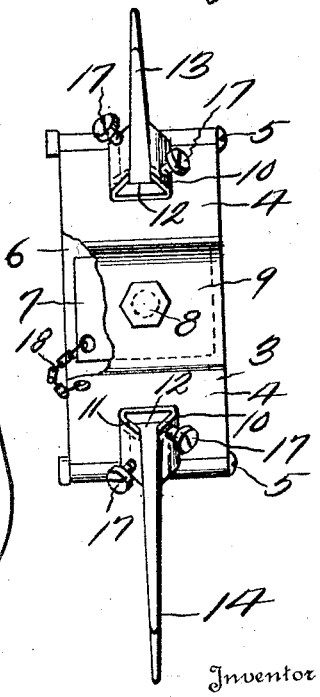
Inventor
A. V. Melin
By D. Swift
his Attorney

UNITED STATES PATENT OFFICE.

AUGUST V. MELIN, OF NORWAY, MICHIGAN.

SNOW AND MUD SHOE.

1,411,740.

Specification of Letters Patent.    Patented Apr. 4, 1922.

Application filed January 11, 1922. Serial No. 528,366.

*To all whom it may concern:*

Be it known that I, AUGUST V. MELIN, a citizen of the United States, residing at Norway, in the county of Dickinson, State of Michigan, have invented a new and useful Snow and Mud Shoe; and I do hereby declare the following to be a full, clear, and exact description of the invention, such as will enable others skilled in the art to which it appertains to make and use the same.

The invention relates to an attachment for automobile wheels and has for its object to provide a device of this character having ground engaging elements for gripping the ground, snow or mud, thereby preventing slipping of the wheels, particularly spinning or skidding.

A further object is to provide a mud shoe for an automobile wheel, said mud shoe comprising a U-shaped member adapted to arch the felly of the wheel, and having detachably connected to the outer end thereof a removable section. Also to provide a movable ground engaging element detachably mounted in channels carried by the arms of the U-shaped member and provided with portions overlying the ends of the removable member carried by the U-shaped member.

A further object is to provide the U-shaped member with a set screw cooperating with the felly for holding the device against movement on the wheel.

With the above and other objects in view the invention resides in the combination and arrangement of parts as hereinafter set forth, shown in the drawings, described and claimed, it being understood that changes in the precise embodiment of the invention may be made within the scope of what is claimed, without departing from the spirit of the invention.

In the drawings:—

Figure 1 is a side elevation of a portion of an automobile wheel, showing the shoe applied thereto.

Figure 2 is a front elevation of the shoe.

Figure 3 is a top plan view of the shoe.

Referring to the drawings, the numeral 1 designates a portion of a conventional form of automobile tire and 2 a wheel felly. The shoe comprises a U-shaped member formed from metal, which member arches the felly 2 and has its diverging arms 4 disposed on each side of the felly 2 and the tire 1. Hingedly connected to the lower ends of the arm 3 by means of bolts 5 is a transversely disposed segmentally shaped plate 6, which engages the tread of the tire 1. It will be seen that by removing either one of the bolts 5, the plate 6 may be moved to a position where the U-shaped member 3 may easily be placed in position on the felly 2 and tire 1. After the U-shaped member 3 has been placed in position and the segmentally shaped plate 6 secured the wear plate 7 is disposed on the inner periphery of the felly 2 and the set screw 8 which is threaded through the transverse portion 9 of the U-shaped member 3 is forced into binding engagement with the plate 7 thereby holding the shoe as a whole against movement, preventing rattling of the shoe and preventing marring of the felly. The arms 4 of the U-shaped member are provided with channel members 10, which channel members are provided with V-shaped channels 11 extending entirely through the same. The V-shaped channels 11 receive the V-shaped sides 12 of ground engaging plates 13 and 14, which are transversely disposed in relation to the wheel and grip into the snow or mud thereby preventing slipping or spinning of the wheel as it moves over the ground. The plate 14 is wider than the plate 13 and disposed outwardly of the wheel where it will clear the side of the automobile of the mechanism. The lower ends of the plates 13 and 14 are provided with integral inwardly extending arms 16 which overlie the ends of the plate 6 and grip the ground beneath the tire 1. The arms 16 also form means for limiting the upward movement of the plates 13 and 14 under the weight of the automobile. Plates 13 and 14 are held in the channels 10 by means of the set screws 17, which extend through the flanges of the channels 10. Plate 7 is preferably secured to the U-shaped member 3 by means of a chain 18 so that said plate cannot be lost or misplaced.

From the above it will be seen that a tire shoe is provided, which is simple in construction and one which may be easily and quickly applied to an automobile wheel. It will also be seen that the detachable plates 13 and 14 are provided with integral arms which extend under the plate 6 and the tire 1 and prevent the plates from being forced upwardly under the weight of the vehicle on which the wheel is disposed, thereby making the gripping action of the plates 13 and 14 positive and obviating the possibility of loss of the plates.

The invention having been set forth what is claimed as new and useful is:—

1. A mud shoe comprising a U-shaped member adapted to arch a wheel felly and tire and having its arms outwardly disposed, a segmentally shaped plate detachably and hingedly connected to the outer ends of said arms, ground engaging plates detachably connected to the arms of the U-shaped member, said detachable plates being provided with inwardly extending integral arms underlying the ends of the segmentally shaped plate.

2. A mud shoe for an automobile wheel, said shoe comprising a U-shaped member arching the felly of the wheel, the arms of said U-shaped member diverging outwardly a segmentally shaped plate detachably connected to the ends of said diverging arms, transversely disposed ground engaging plates carried by said arms, dove tail connections between said plates and the arms, the lower ends of said plates being provided with inwardly extending arms underlying the ends of the segmentally shaped plate and terminating adjacent the center thereof, and means for preventing displacement of the U-shaped member on the wheel.

3. The combination with a mud shoe frame extending around the felly and tire of the wheel and having arms adjacent the sides of the tire, of ground engaging plates carried by said arms and detachably connected thereto in channels, said ground engaging plates being provided with inwardly extending arms engaging the outer face of the frame and forming means for preventing inward displacement of the plates under the weight of the wheel.

In testimony whereof I have signed my name to this specification in the presence of two subscribing witnesses.

AUGUST V. MELIN.

Witnesses:
JOHN ALFRED DJUPLIN,
SIMON ROSBERG.